(12) United States Patent
Baumann et al.

(10) Patent No.: US 9,744,723 B2
(45) Date of Patent: Aug. 29, 2017

(54) DEVICE OF GENERATIVELY MANUFACTURING THREE-DIMENSIONAL OBJECTS WITH INSULATED BUILDING FIELD

(75) Inventors: Andreas Baumann, Gräfelfing (DE); Jochen Philippi, Gräfelfing (DE); Thomas Mattes, Gilching (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 324 days.

(21) Appl. No.: 12/982,491

(22) Filed: Dec. 30, 2010

(65) Prior Publication Data
US 2011/0168091 A1 Jul. 14, 2011

(30) Foreign Application Priority Data
Jan. 5, 2010 (DE) .................... 10 2010 004 035

(51) Int. Cl.
*B29C 35/08* (2006.01)
*B29C 67/00* (2017.01)
(Continued)

(52) U.S. Cl.
CPC ........ *B29C 67/0077* (2013.01); *B22F 3/1055* (2013.01); *B29C 67/0085* (2013.01); *B33Y 30/00* (2014.12); *Y02P 10/295* (2015.11)

(58) Field of Classification Search
CPC . B29C 67/0077; B29C 67/0085; B33Y 30/00; B22F 3/1055; B22F 2003/1056; B22F 3/008; B28B 1/001
See application file for complete search history.

(56) References Cited

U.S. PATENT DOCUMENTS 4,530,153 A * 7/1985 Pearson ................... 29/623.1
5,730,925 A * 3/1998 Mattes .................. B22F 3/1055
219/121.73
(Continued)

FOREIGN PATENT DOCUMENTS

CN 1939703 A 4/2007
DE 10 2006 014 281 A1 10/2006
(Continued)

OTHER PUBLICATIONS http://www.engineeringtoolbox.com/thermal-conductivity-d_429.html.*

*Primary Examiner* — Yogendra Gupta
*Assistant Examiner* — Ninh Le
(74) *Attorney, Agent, or Firm* — Seyfarth Shaw LLP

(57) ABSTRACT

The present invention relates to a device for generatively manufacturing a three-dimensional object (3), comprising: a frame (1) defining a building field (6) at an upper portion (2) thereof; a plate (12) which connects the frame (1) with a housing (100) of the device; a support (5) which is arranged in the frame (1) and vertically movable by a lift mechanics (4) at least below the building field (6); a radiation device (7) which generates an energetic beam (8, 8') which is focused by a deflection means (9) to arbitrary points in the building field (6), so as to selectively sinter or melt a powdery material (11) which is present in the building field (6); a coater (10) for applying a layer of powdery material (11) onto the support (5) or a previously applied layer of the powdery material (11). A thermal insulation (13) is arranged between the frame (1) and the plate.

6 Claims, 4 Drawing Sheets

Figure 1:
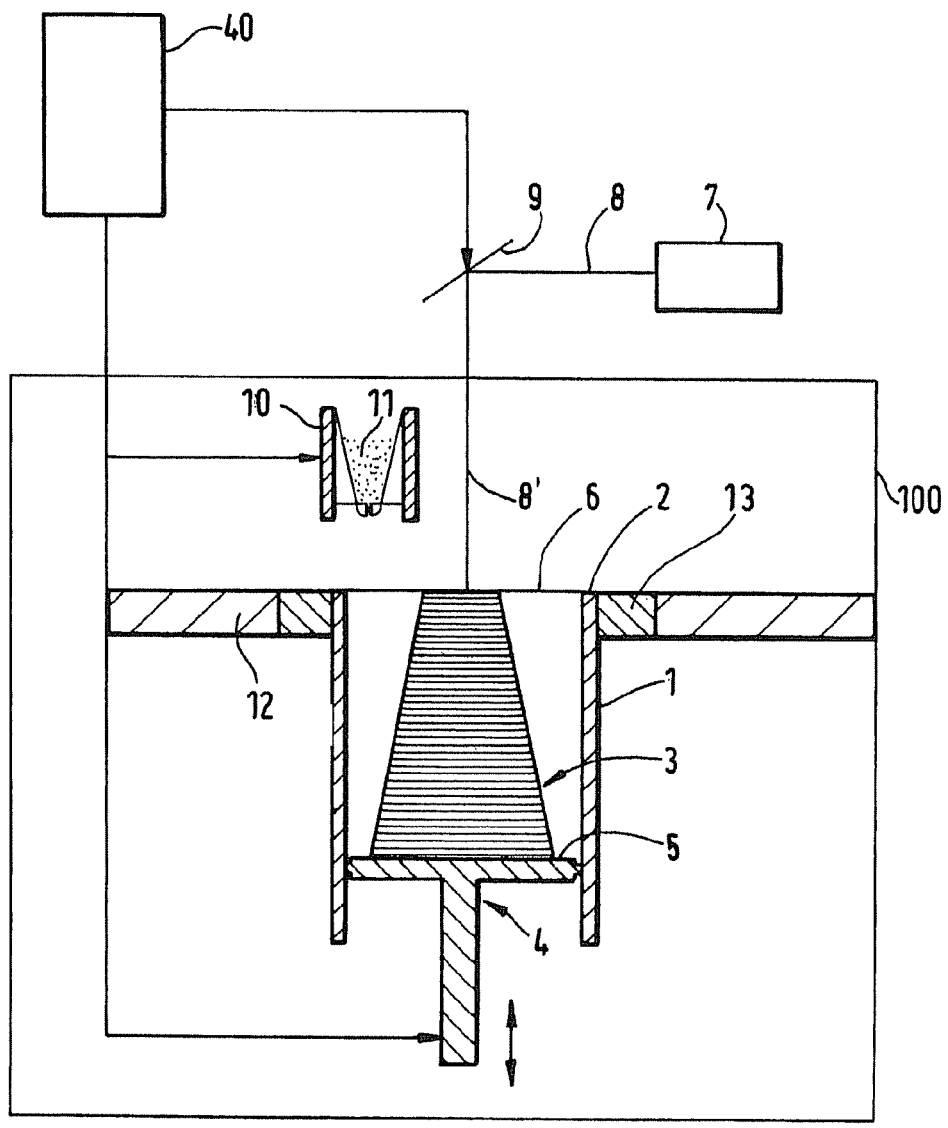

(51) Int. Cl.
   *B33Y 30/00* (2015.01)
   *B22F 3/105* (2006.01)

(56) References Cited

U.S. PATENT DOCUMENTS

| | | | |
|---|---|---|---|
| 5,908,569 A | 6/1999 | Wilkening et al. | |
| 5,916,681 A * | 6/1999 | Cipin | 428/403 |
| 6,332,090 B1 * | 12/2001 | DeFrank et al. | 600/474 |
| 6,554,600 B1 | 4/2003 | Hofmann et al. | |
| 6,767,499 B1 | 7/2004 | Hory et al. | |
| 7,351,051 B2 | 4/2008 | Hagiwara | |
| 2002/0067031 A1 * | 6/2002 | Busgen et al. | 280/733 |
| 2002/0149137 A1 * | 10/2002 | Jang | B29C 67/0081 264/494 |
| 2002/0195746 A1 * | 12/2002 | Hull et al. | 264/401 |
| 2006/0219671 A1 | 10/2006 | Merot et al. | |
| 2007/0026099 A1 * | 2/2007 | Hagiwara | 425/174.4 |
| 2007/0026145 A1 | 2/2007 | Lindemann et al. | |
| 2007/0074659 A1 | 4/2007 | Wahlstrom | |
| 2007/0298182 A1 | 12/2007 | Perret et al. | |
| 2008/0131104 A1 * | 6/2008 | Philippi | 392/407 |
| 2009/0019634 A1 * | 1/2009 | Lipponen | 4/524 |
| 2009/0045553 A1 | 2/2009 | Weidinger et al. | |
| 2009/0169664 A1 * | 7/2009 | Cox | B01F 3/188 425/174.4 |
| 2009/0206522 A1 | 8/2009 | Hein et al. | |
| 2009/0246445 A1 * | 10/2009 | Peterson | 428/68 |
| 2009/0295039 A1 | 12/2009 | Fruth et al. | |
| 2010/0097798 A1 * | 4/2010 | Young | 362/235 |

FOREIGN PATENT DOCUMENTS

| | | | |
|---|---|---|---|
| DE | 103 42 883 B4 | 7/2007 | |
| DE | 10 2006 053 121 | 12/2007 | |
| EP | 0 759 848 B1 | 6/1998 | |
| EP | 0 764 079 B1 | 7/1998 | |
| EP | 1704989 | 9/2006 | |
| EP | 1 037 739 B2 | 3/2008 | |
| FR | 2774931 | 8/1999 | |
| JP | 2007-30303 | 2/2007 | |
| JP | 2008538333 | 10/2008 | |
| RU | 2368478 C2 | 9/2009 | |
| RU | 2370367 C1 | 10/2009 | |
| WO | WO 9534468 A1 * | 12/1995 | B29C 31/04 |
| WO | 96/29192 A1 | 9/1996 | |
| WO | 2005025780 | 3/2005 | |

* cited by examiner

DEVICE OF GENERATIVELY MANUFACTURING THREE-DIMENSIONAL OBJECTS WITH INSULATED BUILDING FIELD

The present invention relates to a device for generatively manufacturing a three-dimensional object.

EP 0 764 079 B1 describes a known laser sintering device comprising a frame which surrounds at its upper portion a building field; a support which is arranged within the frame and vertically movable at least below the building field by a lift mechanics; a radiation device generating an energetic beam which is focused on arbitrary points within the building field by a deflection device so as to selectively sinter or melt a powdery material which is present in the building field; a coater for applying a layer of powdery material onto the support or a previously applied layer of the powdery material. The laser sintering device has a heating means which serves to heat-on a powdery layer, which has been applied by a coater, to a pre-temperature required for the sintering process by means of the laser beam. In spite of the use of the heating means, inhomogeneous temperatures may occur in the building field, whereby the mechanical properties of the objects can be inhomogeneous.

It is the object of the present invention to provide a device for generatively manufacturing a three-dimensional object, by which the mechanical properties of the manufactured objects can be improved.

This object is achieved by the device for generatively manufacturing a three-dimensional object having the features of claim 1. Advantageous further developments are subject of the dependent claims.

The invention has the advantage that the frame is thermally insulated from the housing of the device by the insulation, so that less heat escapes from the building field to the housing of the device. Advantageously, the temperature gradients, in particular in the area of the building field, are thereby reduced. By systematically reducing the heat loss, the temperature fall in the peripheral area of the building field can positively be affected, so that an adjustment to different geometries of the work pieces and different kinds of powders are possible. For example, the effectively usable area within the building field and the shrinkage properties of the objects to be manufactured can be improved.

Figure 2:
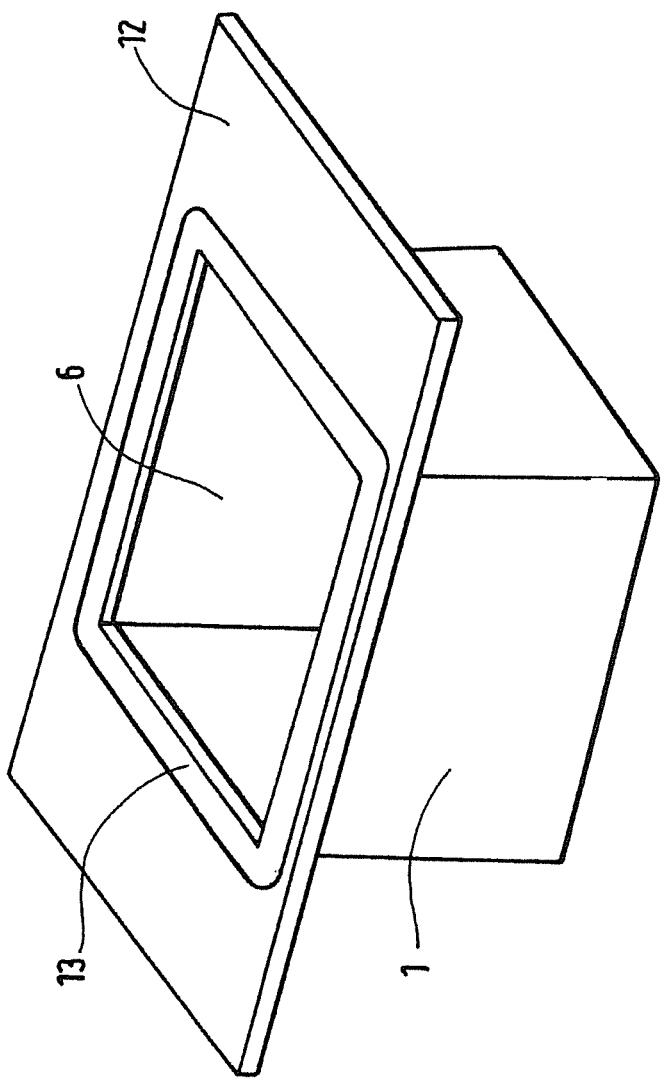
Figure 3:
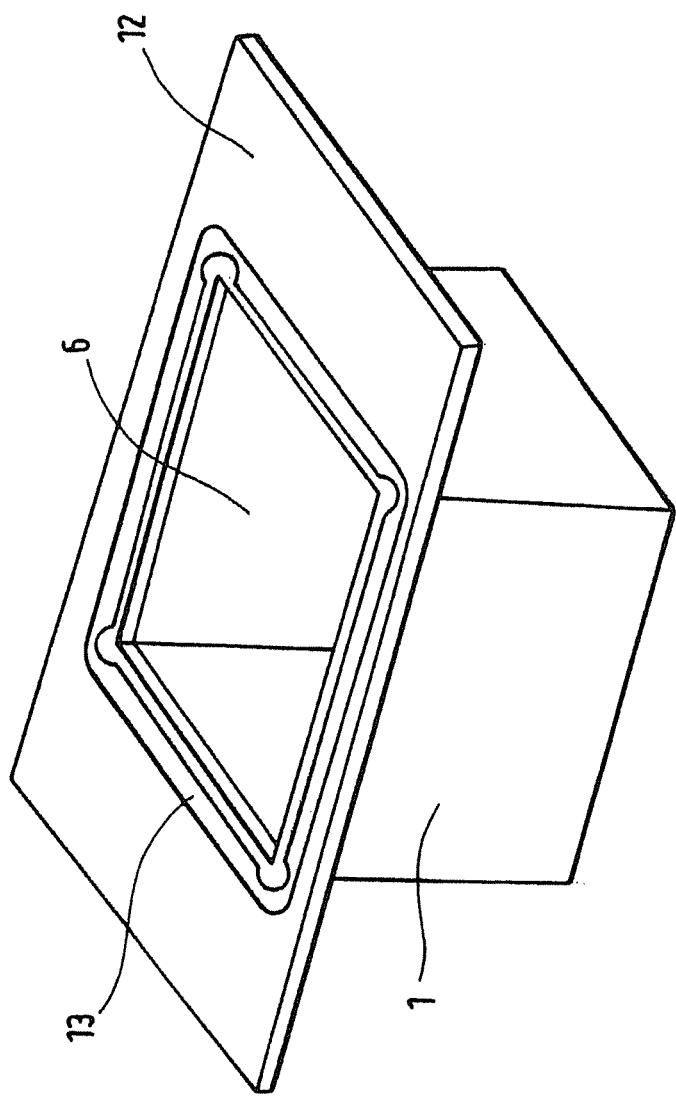
Figure 4:
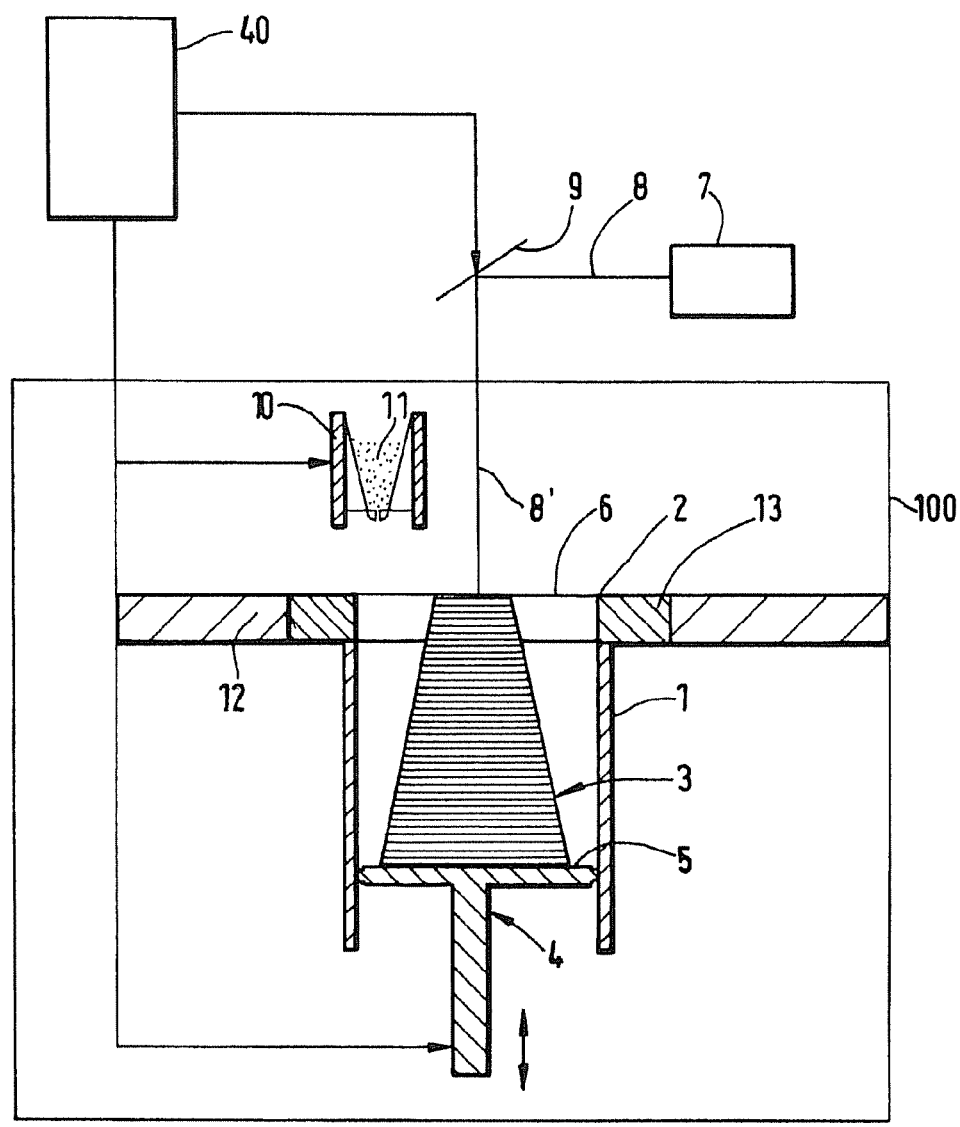

Further features and aims of the invention can be gathered from the description of embodiments on the basis of the attached drawings. In the Figures show:

FIG. 1 a schematic view of a device for manufacturing a three-dimensional object according to a first embodiment of the present invention;

FIG. 2 a schematic view of a thermal insulation at a building field of the device according to the first embodiment;

FIG. 3 a schematic view of a thermal insulation at a building field of the device according to a second embodiment of the present invention;

FIG. 4 a schematic view of a device for manufacturing a three-dimensional object according to a modification of the first embodiment of the present invention.

FIG. 1 shows schematic view of a device for manufacturing a three-dimensional object 3 according to a first embodiment of the present invention which is exemplarily embodied as laser sintering device.

The laser sintering device comprises a frame 1 which opens at the top and comprises therein a support 5 which is movable in the vertical direction and supports the three-dimensional object 3 to be manufactured. The frame 1 surrounds at its upper portion 2 a building field 6. Preferably, the frame 1 and the support 5 form an exchangeable replacement frame which can be removed from the laser sintering device. The support 5 is connected to a lift mechanics 4, by which it is moved in the vertical direction at least below the plane of the building field 6, such that the upper side of the powdery layer, which is to be solidified, lies in the plane of the building field 6. As the plane of the building field, a plane is considered here, in which the upper periphery of the upper portion 2 lies.

Further, a coater 10 for applying a layer of a powdery material 11 is provided. As powdery material 11, all laser sinterable powders can be used, such as laser-sinterable polymers such as polyaryleetherketone, polyarylethersulfane, polyamide, polyester, polyether, polyolefine, polystyrene, polyphenylsulfide, polyvinylidenfluoride, polyphenylenoxyde, polyimide, their copolymers and blends which include at least one of the preceding polymers; however the selection is not restricted to the above-mentioned polymer and copolymer. Polyaryleetherketone, which are particularly suitable, can be selected from the group of polyetheretherketone (PEEK), polyetherketoneketone (PEKK), polyetherketone (PEK), polyetheretherketoneeketone (PEEKK) and polyetherketoneetherketoneeketone (PEKEKK) and polyetheretheretherketone (PEEEK) as well as their copolymers, in particular with polyurylethersulfone as well as their blends thereof can be selected which includes at least one of the above-mentioned polymers. Polyamide-polymer or copolymer and the blends thereof, which are particularly suitable, can be selected from the group which consists of polyamide 6/6T, polyamideelastomere such as polyetherblockamide such as PEBAX-based materials, polyamide 6, polyamide 66, polyamide 11, polyamide 12, polyamide 612, polyamide 610, polyamide 1010, polyamide 1212, polyamide PA6T/66, PA4T/46 and copolymers which include at least one of the above-mentioned polymers. Suitable polyester polymer or copolymer can be selected from polyalkylentererephtholate (for example PET, PBT) and their copolymers. Suitable polyolefinepolymere or copolymer can be selected from a group of consisting of polyethylene and polypropylene. Suitable polystyrenepolymer or copolymer can be selected from a group consisting of syndiotactic and isotactic polysterene. Further, compound powder of polymer can be used, which include fillers and/or additives in addition to the corresponding polymer, copolymer or blend. Such fillers are for example fibers, such as coal or glass-fibers and carbon-nano tubes, fillers having a low aspect ratio such as glass-beads or aluminum grains, mineral fillers, such as titan dioxide. The additives can be, amongst others, process assisting means such as ripple-assisting means of the aerosol-series (such as Aerosil 200), functional additives such as heat stabilisators, oxidation stabilisators, color pigments (such as graphite and soot) and fire-proof means (such as organophosphate, polybromeneated hydrocarbon). As powdery material 11, also metals, ceramics, molding sand and compound materials can be used. As metal-containing powdery material, arbitrary metals and their alloys as well as mixtures of metallic components or non-metallic components can be considered.

The coater 10 is moved in a predetermined height above the building field 6, such that the layer of the powdery material 11 lies in a defined height above the support 5 and/or above the last solidified layer. The device further comprises a radiation device in the shape of a laser 7 which generates a laser beam 8, 8' which is focused to arbitrary points in the building field 6 by a deflection device 9.

Thereby, the laser beam 8, 8' can selectively solidifying the powdery material 11 at locations corresponding to the cross-section of the object 3 to be manufactured.

The laser sintering device may comprise a heating device (not shown) above the building field 6 in order to pre-heat a newly applied powdery layer to a temperature close to the process-temperature required for the solidification of the powdery material 11.

Reference sign 100 designates a housing, in which the frame 1, the support 5, and the coater 10 are arranged. In the following, the inside of the housing 100 is referred as building space. Preferably, the housing is gas-tightly formed and has in the upper area an inlet for introducing the laser beam 8, 8'. Preferably, an inert gas is introduced into the housing 100. Further, a control unit 40 is provided, by which the device is controlled in a coordinated manner to perform the building process and to control the application of energy by the laser 7.

In the device, a plate 12 is provided which is in contact with the frame 1, for example at the upper portion 2 thereof, and with a housing of the device.

The device has a thermal insulation 13 which is arranged between the frame 1 and the plate 12. The thermal insulation 13 is preferably arranged in the plane of the building field 6, but it can also be located below or above the plane of the building field 6. FIG. 2 shows that the insulation 13 is integrally formed in the plate 12 and circumferentially arranged around the frame 1. The frame 1 is thermally insulated from the housing 100 of the device by the insulation 13, so that less heat escapes from the building field 6 to the housing 100 and to the building field environment surrounding the building field. Advantageously, temperature gradients, in particular in the peripheral area of the building field 6, are thereby reduced. The term "building field environment" hereby designates an area which lies in the plane of the building field 6 within the housing 100 and laterally adjoins to the building field 6 and extends between the building field 6 and the housing 100.

The insulation 13 can releasable be mounted to the plate 12. Thereby, it is possible to form the insulation 13 as an exchangeable insert.

FIG. 3 shows a second embodiment of the thermal insulation 13. This insulation 13 has different heat conductivities at different circumferential positions of the frame 1. The insulation 13 extends horizontally outward from the frame 1, wherein the dimension of the horizontal extension changes at different circumferential positions of the frame 1. Preferably, the dimension of the horizontal extension at the corners of the frame 1 is larger than at other circumferential positions of the frame 1. Thereby, the heat loss is variable along the circumference of the building field 6, and the heat loss can be reduced in particular at the corners of the frame 1. By systematically reducing the heat loss, the temperature fall can positively be affected in the peripheral area of the building field 6, so that adjustments to different workpiece geometries and different kinds of powders are possible. For example, the effectively usable area of the building field 6 and the shrinking properties of the object 3 to be manufactured can be improved.

For example, to achieve different specific heat conductivities, the insulation 13 can contain different materials, which have different specific heat conductivities, at different circumferential positions of the frame 1. According to the task, different insulations 13, which have different dimensions of the horizontal extension and/or different materials, can be mounted to different circumferential positions of the frame 1 at the plate 12.

It is conceivable that the insulation 13 consists of an insulation material with mechanical load capacity, an insulation material without mechanical load capacity or a combination thereof.

The advantage of an insulation material with mechanical load capacity lies in that this can be directly fixed to the frame without providing a specific frame or bracket. Furthermore, the insulation material with mechanical load capacity can be easily cut, and it is easily exchangeable. However, compared with an insulation material without mechanical load capacity, the insulation effect is generally smaller. An example of an insulation material with mechanical load capacity is the material DOTHERM or DOGLAS of the company DOTHERM GmbH & Co. KG. However, the invention is not restricted to this material.

The advantages of an insulation material without mechanical load capacity compared with an insulation material with mechanical load capacity are an improved insulation effect as well as the cheaper material costs and a better availability. However, compared with the insulation material with mechanical load capacity, the insulation material without mechanical load capacity must generally be provided with a suitable frame, bracket or housing. Examples of an insulation material without mechanical load capacity are glass-fiber webs, glass-fiber mats or the material PROMA-LIGHT of the company Promat GmbH. However, the invention is not restricted to these materials.

The insulation 13 can consist of a heat-resistant synthetic plastic. Examples of suitable synthetic plastics are polystyrene, polyimide, polyetherimide, polybenzimidazole (PBI), PUR, aromatic polyamide, polyacrynitrile. By mixing-up with phenole-formaldehyde resin, an improved temperature stability can be achieved.

Moreover, it is conceivable to use the powdery material 11 itself, which is used for building, as insulation material. In this case, the thermal insulation can be realized by a gap (not shown) between the frame 1 and the plate 12, wherein the gap is closed and/or powder-tightly sealed at the bottom. Such sealing of the gap can be achieved by use of a flexible seal. When the coater 10 applies a layer of the powdery material 11 onto the support 5 or a previously applied layer of the powdery material 11, the gap is thereby filled with the powdery material 11. The powdery material 11 in the gap has generally an excellent thermal insulation effect.

During operation of the device, the support 5 is moved downwards in a first step by the lift mechanics 4 as far as the upper side thereof lies below the plane of the building field 6 by the desired thickness of the first powdery layer. Then, a first layer of the powdery material 11 is applied and smoothened onto the support 5 by the coater 10.

If the heating device is provided, the temperature of the uppermost powdery material 11 can globally be pre-heated to a few ° C. below the process temperature required for the solidification by the heating device. Thereafter, the control unit 40 controls the deflection means 9 such that the deflected laser beam 8, 8' selectively impacts on the locations of the layer of the powdery material 11 which shall be solidified. Thereby, the powdery material 11 is solidified and/or sintered at these locations, so that the three-dimensional object 3 is generated here.

In a next step, the support 5 is lowered by the lift mechanics 4 by the desired thickness of the next layer. By the coater 10, a second powdery material layer is applied, smoothened and selectively solidified by means of the laser beam 8, 8'. These steps are repeated until the desired object 3 is manufactured.

By the thermal insulation 13, the temperature gradients, in particular in the peripheral area of the building field 6, can thereby be reduced.

The device according to the invention is particularly applicable in laser sintering processes, where the temperature of the uppermost powdery layer in the building field 6 is pre-heated by a separate heat device to few ° C. below the process-temperature required for the solidification, wherein the additional radiation by the laser beam 8' provides for a further application of energy in order to solidify the powdery material. This particularly applies in the use of powdery synthetic plastic material.

The scope of protection is not restricted to the described embodiments, but it includes further changes and modifications, provided that they fall within the scope as defined by the attached claims.

For example, the device according to the invention is not only applied to laser sintering, but to all powder-based generative methods, where a material and/or powdery material is used in each layer to be applied, wherein the material is solidified by energetic radiation. The energetic radiation must not necessarily be a laser beam 8', but it can also be an electron beam, for example.

In the first embodiment according to FIG. 1, the thermal insulation 13 is substantially arranged in the plane of the building field 6 which has been defined by the upper periphery of the upper portion 2 of the frame 1. However, the insulation 13 has not to be arranged at an outer circumference of the frame 1, as it is the case in the first embodiment according to FIG. 1. FIG. 4 shows a modification, where the thermal insulation 13 is arranged above the upper portion 2 of the frame 1 and preferably in contact therewith. When the frame 1 is embodied as replacement frame, the upper portion 2 of the replacement frame 1 can abut from the bottom to the insulation 13. Advantageously, a good sealing between the replacement frame 1 and the insulation 13 is thereby achieved. The "plane of the building field" is not anymore defined by the upper periphery of the portion 2 in this embodiment, but by the upper side of the plate 12 which lies in this plane.

Further, the insulation 13 has not to completely surround the frame 1 in all embodiments, but it can be arranged only at some locations of the circumference of the frame 1.

Furthermore, it is advantageous when the insulation 13 is arranged in close proximity of the frame 1 and directly adjoins thereto, for example.

The invention claimed is:

1. A device for generatively manufacturing a three-dimensional object, comprising: a housing; an exchangeable frame that is modularly insertable into and removable from the housing; a thermal insulation having a vertical side and a horizontal bottom; a horizontal plate that is arranged in parallel to a horizontal plane of a building field and that surrounds the exchangeable frame on all sides of the exchangeable frame, the horizontal plate being in contact with the housing, the horizontal plate having a depth along a side of the horizontal plate facing the thermal insulation; a support arranged in the exchangeable frame and vertically movable by a lift mechanism; a radiation device that generates an energetic beam that is focused onto the building field by a deflector so as to selectively sinter or melt a powdery material present in the building field; a coater for applying a layer of a powdery material onto the support or a previously applied layer of the powdery material; and the thermal insulation arranged between the exchangeable frame and the horizontal plate, wherein the thermal insulation is releasably mounted in the horizontal plate and formed as an exchangeable insert, and mounted within a full depth of the horizontal plate; and the thermal insulation is made of a solid integral material and circumferentially surrounds an upper portion of the exchangeable frame on all sides of the exchangeable frame so that the upper portion of the exchangeable frame is contacting the horizontal bottom of the thermal insulation.

2. The device according to claim 1, wherein the thermal insulation has different heat conductivities at different circumferential positions of the horizontal plate.

3. The device according to claim 1, wherein the thermal insulation extends horizontally outward from the horizontal plate at a horizontal extension and a dimension of the horizontal extension changes at different circumferential positions of the horizontal plate.

4. The device according to claim 3, wherein the dimension of the horizontal extension at corners of the horizontal plate is larger than at other circumferential positions of the horizontal plate.

5. The device according to claim 1, wherein the thermal insulation contains different materials at different circumferential positions of the horizontal plate.

6. The device according to claim 1, wherein the thermal insulation includes an insulation material with mechanical load capacity and/or an insulation material without mechanical load capacity.

* * * * *